April 21, 1970 H. DEHLEN ET AL 3,508,011
ARRANGEMENT ENABLING TELEPHONE SUBSCRIBER TO BLOCK HIMSELF AGAINST TERMINATING CALLS
Filed Jan. 26, 1967
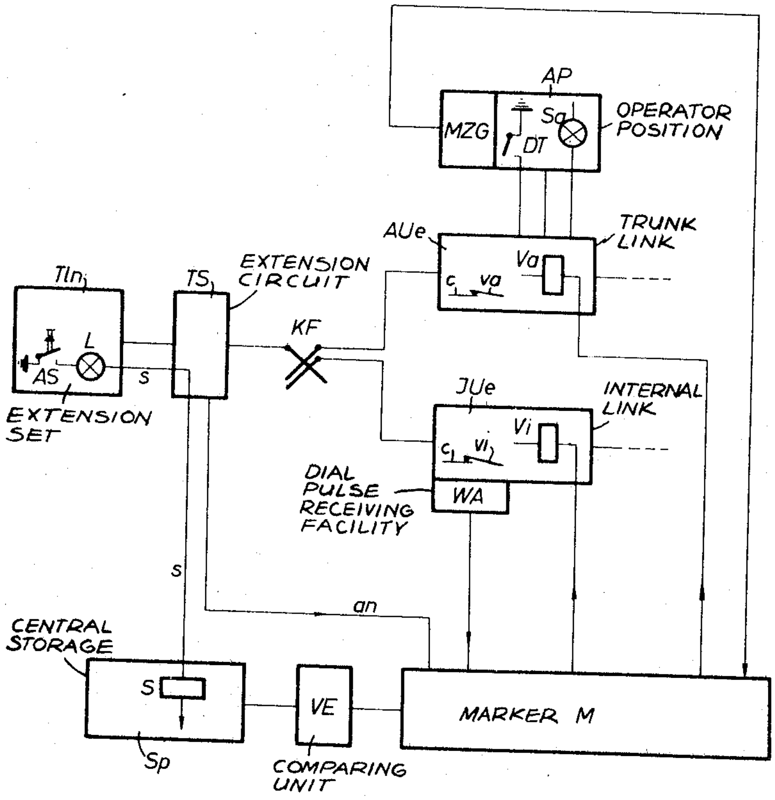
H. DEHLEN
K. RICHTER
INVENTORS
BY Delbert B. Warner
ATTORNEY 3,508,011

ARRANGEMENT ENABLING A TELEPHONE SUBSCRIBER TO BLOCK HIMSELF AGAINST TERMINATING CALLS

Hilmar Dehlen, Munchingen, Wurttemberg, and Kurt Richter, Stuttgart-Rot, Germany, assignors to International Standard Electric Corporation, New York, N.Y., a corporation of Delaware Filed Jan. 26, 1967, Ser. No. 612,015
Claims priority, application Germany, Feb. 11, 1966, St 24,987
Int. Cl. H04m 3/42
U.S. Cl. 179—27 6 Claims

ABSTRACT OF THE DISCLOSURE

Means are provided in a private branch exchange enabling a subscriber to prevent incoming calls from reaching himself. The means is activated by a button on the receiver which may be pressed to connect the receiver through a special wire to a relay or other control unit in the central storage unit. The relay identifies that the particular receiver having a particular call number to be stopped from receiving incoming calls. Calls into the control unit are all compared with stored numbers and if a call for a particular number coincides with a number to be blocked then that incoming call is blocked. An announcement is provided to inform callers that the call has been blocked. Means are provided enabling the operator to call the blocked extension in case of emergency or unusual urgency.

The invention relates to a circuit arrangement for telephone exchanges and particularly private branch exchanges, in which a subscriber is able to prevent the completion of a terminating connection to himself.

Protection against calls is made usually by identifying the extension desiring privacy in a central storage and comparing this stored information with incoming dial information in a control element. Completion of the connection is prevented, if the result of the comparison is positive.

With the aid of such a circuit arrangement, it is possible for an extension to block himself against terminating calls. This feature is known by designations such as "protection against calls" and "telephone intermission." An article by H. Oden, "New Features in Telephony" (Ingenieur der Deutschen Bundespost) 1965, No. 2, pp. 48–58, paragraph 4.1.2 (pp. 51–52), describes a system serving this purpose.

The system described by Oden requires that the subscriber or extension must first contact the competent office and obtain the authorization. Thereafter, the extension can establish the "telephone call intermission," by lifting his handset, dialing his own call number followed by a code number. With this dialing an individually associated storage cell of a central storage is brought into the condition "telephone call intermission." The subscriber or extension can make outgoing calls without any restrictions. Terminating calls are switched to an announcement device, informing the caller that the called subscriber or extension does not want to be called. This switch-over is made when, during the establishment of a connection—e.g. by comparing the stored subscriber identity with the identity given by the dial information, it is determined that the call is destined for a subscriber or extension who has blocked himself against terminating calls. The "telephone intermission" can be cancelled by dialing defined code numbers.

Such facilities are also useful for private branch exchanges, particularly for exchanges in hotels, but their mode of operation is intricate. It is an object of the invention to simplify the operation of such a system, in order to enable a hotel guest to be protected against any calls by just actuating a switch or button.

The problem is solved, according to the invention, by providing individual storage means for each subscriber or extension, their responding and holding circuits passing over a signal wire provided for each extension and ending in a switch at the associated telephone set.

The increased expenditure caused by the additional signal wire is low for a private branch exchange and is more than compensated by the comfort offered: without lifting the handset, just by actuating a switch the "telephone intermission" is obtained. The manipulation can be explained to a hotel guest, or other subscriber, with a few words.

A further embodiment of the invention provides that, series-connected with the switch, a condition indicating means is inserted, indicating the "telephone intermission" condition.

The extension, e.g. the guest in a hotel, can always see on his telephone set that he is switched to "telephone intermission." If he is not yet familiar with the system he is constantly reminded that he cannot be called. The indicating means can be a lamp, for example.

The circuit arrangement is such that, during establishment of a connection, i.e. seizure of a link, by a calling subscriber or extension to call another subscriber, a switching means is excited in that link, preventing the complete establishment of a connection, if the comparison in the respective link is positive.

The establishment of a connection is prevented by switching means, excited in the link, which disconnects the seizing wire in said link.

It may be that an important call is present for an extension, switched to "telephone intermission." This is the case if a hotel guest leaves a call to be wakened by telephone. If the guest's set is switched to "telephone intermission" such a call would not be completed in the absence of special provisions. Also, a caller, having received the announcement that the called person does not want to be disturbed, may dial the operator and inform her that his call is of particular importance. It is, therefore, another object of the present invention to enable the operator to call an extension switched to "telephone intermission" in such circumstances. This is achieved according to the invention by the inclusion of means enabling an operator to override the means preventing the establishment of a defined connection.

The invention is now explained in detail with the aid of an example shown on the accompanying drawing.

To establish a connection the subscriber or extension lifts his handset, its extension circuit TS starts the marker M in the figure which establishes a connection to an available internal link IU*e* via the switching grid KF. This is called the starting process. The calling extension receives proceed-to-dial tone, he or she dials and the dial information items are received by the dial pulses receiving facility WA, associated with the internal link IU*e*. After dialling, the marker M is requested again, transfers the dial information and establishes, in a known way, a connection to the called extension. A trunk or external link AU*e*, serving as a recording line with extending facility, can also establish a connection through an operator at the operator's position AP. The operator, for example, answers a call terminating at the trunk link AU*e* and dials the number of the called extension, via the marking keysender MZG, into the marker, which thereupon establishes the connection. This procedure for establishing a connection is called traffic routing.

If an extension wants to be blocked against terminating calls, he or she actuates the key AS at the extension set T*ln*. This key is of the engaging type. The contact thereby closed excites via the signal wires the storage means associated to said extension (of which means a relay S is shown) in the central storage *Sp*. A lamp L is lit in said circuit, to continuously indicate the "telephone intermission" condition.

During a traffic routing process the identity of the called extension, given by the dial information and present in the marker, is now compared with the aid of the comparing unit VE with the extension identities, registered in the storage or memory *Sp*. If a call is present for an extension switched to "telephone intermission," the comparing unit VE will furnish a positive announcement, causing the marker to energize in the respective link (IU*e* or AU*e*) a relay V*i* or V*a*, respectively. This relay disconnects in the associated link the seizing wire (*c*-wire) and the connection cannot be established. The speech wires can now be connected to a centrally arranged announcing device (not shown) which gives a corresponding announcement to the caller.

If the connection was initiated by the operator at the operator's position AP through a trunk link AU*e*, relay VA causes lighting of the lamp S*a* at the operator's position. The operator may now decide whether she shall extend the call to the extension, being blocked in the "telephone intermission." She actuates the key DT at the operator's position AP causing relay V*a* to drop (e.g. by exciting a relay which opens a contact in the circuit of relay V*a*). Now the call is extended to the extension set, although said extension set was blocked against calls during the night, for example. It will be noted that the operator's call to the extension only causes the cancellation of the blocking for one traffic routing process. Protection against calls remains until the extension releases the key AS whereby the lamp L extinguishes and the storage means (relay S) drops.

While the principles of the invention have been described above in connection with specific apparatus and applications, it is to be understood that this description is made only by way of example and not as a limitation on the scope of the invention.

What is claimed is:

1. A switching arrangement in telephone exchanges for selectively preventing the reception of undesired calls comprising:
- means for storing the identity of a telephone set to which calls are to be blocked in a central memory,
- means for comparing dial information with the identity stored in the central memory, and
- means for preventing completion of a connection if the comparison is positive,
- said means for storing the identity including circuit means individually associated with the telephone set and connected to the central memory over a separate control circuit from a separate switch forming a part of said telephone set.

2. A switching arrangement according to claim 1, in which
- the telephone set includes an indicating means forming a part of the telephone set, and
- means connecting the indicating means in series with the switch to visually designate the condition of blocking all calls to the telephone set.

3. A switching arrangement according to claim 1, in which
- the means for preventing completion of a connection includes switching means in a link which is excited in case of a positive result of the comparison,
- said switching means, when excited, preventing the establishment of the connection.

4. A switching arrangement according to claim 3, in which
- the switching means, excited in the link, disconnects a seizing wire in the link.

5. A switching arrangement according to claim 4, in which
- means are provided in an operator's position to release the switching means excited in a link and thereby complete a call to the telephone set.

6. A switching arrangement in telephone exchanges for selectively preventing the reception of undesired calls, comprising:
- means for storing the identity of a telephone set to which calls are to be blocked in a central memory,
- said means for storing the identity including means individually associated with the telephone set and operable over a signal wire from a switch associated with said telephone set,
- means for comparing dial information with the identity stored in the central memory,
- means for preventing completion of a connection if the comparison is positive,
- the means for preventing completion of a connection including switching means in a link which is excited in case of a positive result of the comparison,
- said switching means, when excited, preventing the establishment of the connection,
- the switching means, excited in the link, disconnecting a seizing wire in the link, and
- means provided in an operator's position to release the switching means excited in a link and thereby complete a call to the telephone set.

References Cited

UNITED STATES PATENTS

| | | | |
|---|---|---|---|
| 2,268,397 | 12/1941 | Hersey | 179—27.25 |
| 3,187,108 | 6/1965 | Clin | 179—84 |

RALPH D. BLAKESLEE, Primary Examiner

U.S. Cl. X.R.

179—18, 84